(12) United States Patent
Dietl

(10) Patent No.: US 7,802,838 B2
(45) Date of Patent: Sep. 28, 2010

(54) SOFT TOP FOR A MOTOR VEHICLE

(75) Inventor: Rudolf Dietl, Munich (DE)

(73) Assignee: Webasto AG, Stockdorf (DE)

( * ) Notice: Subject to any disclaimer, the term of this patent is extended or adjusted under 35 U.S.C. 154(b) by 204 days.

(21) Appl. No.: 12/299,243

(22) PCT Filed: Apr. 30, 2007

(86) PCT No.: PCT/DE2007/000771

§ 371 (c)(1),
(2), (4) Date: Oct. 31, 2008

(87) PCT Pub. No.: WO2007/128269

PCT Pub. Date: Nov. 15, 2007

(65) Prior Publication Data

US 2009/0072590 A1    Mar. 19, 2009

(30) Foreign Application Priority Data

May 4, 2006    (DE) .................. 10 2006 020 873

(51) Int. Cl.
*B60J 7/185*    (2006.01)
(52) U.S. Cl. .................. 296/124; 296/128; 296/107.08; 292/DIG. 5
(58) Field of Classification Search .................. 296/124, 296/125, 126, 128, 131–134, 107.08; 292/121, 292/126, 240, 219, 226
See application file for complete search history.

(56) References Cited

U.S. PATENT DOCUMENTS

| | | | |
|---|---|---|---|
| 5,839,778 A | 11/1998 | Schaible | |
| 5,868,454 A | 2/1999 | Homann | |
| 6,361,086 B1 | 3/2002 | Robbins | |
| 2003/0059254 A1 | 3/2003 | Homann | |

FOREIGN PATENT DOCUMENTS

| | | |
|---|---|---|
| DE | 19507431 | 8/1996 |
| DE | 10241799 | 3/2004 |
| DE | 10313496 | 10/2004 |
| DE | 10200452236 | 5/2006 |
| EP | 0763439 | 3/1997 |
| EP | 1295746 | 3/2003 |

OTHER PUBLICATIONS

International Search Report dated Sep. 12, 2007.

*Primary Examiner*—Patricia L Engle
(74) *Attorney, Agent, or Firm*—Fitch, Even, Tabin & Flannery; John M. Naber

(57) ABSTRACT

A soft top for a motor vehicle, lockable on a windshield frame by a latch disposed on a forward soft top section and swivelable to a locked position, the soft top movable to a rearward stowed position once the latch has been swiveled into an unlocked position. A locking mechanism provides a catch hook on the vehicle body swivelable between a releasing position and a blocking position, in which the same engages with a catch hook engaging part that is mounted on the soft top or the vehicle body when the soft top is in the blocked state. The locking mechanism is fitted with a spring device, against the spring force of which the soft top runs into the stowed position, while the catch hook can be swiveled into the released position by means of the locking drive in order to release the locking mechanism.

8 Claims, 3 Drawing Sheets

SOFT TOP FOR A MOTOR VEHICLE

Figure 1:
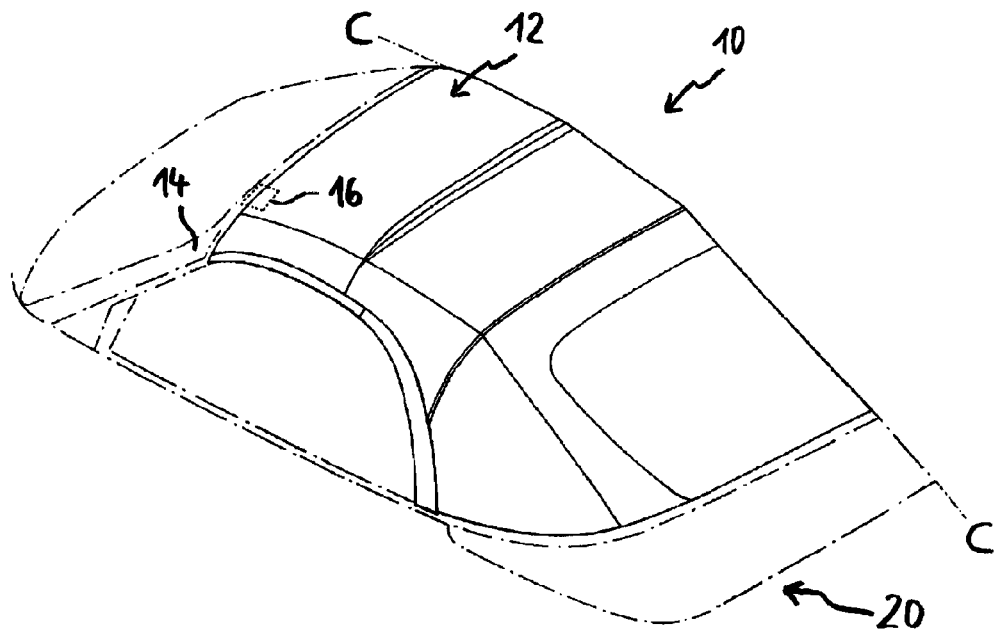

This application is a 35 U.S.C. §371 National Stage entry of PCT/DE2007/000771, filed Apr. 30, 2007, which claims priority from German Patent Application No.: DE 10 2006 020 873.0, filed May 4, 2006, the contents of which are herein incorporated by reference.

The present invention relates to a soft top for a motor vehicle, in particular a cabriolet vehicle, as claimed in the preamble of claim 1.

Such a soft top for a motor vehicle is, for example, known from EP 0 763 439 B1 and comprises a locking device arranged on a front soft top portion which respectively has on both sides a motor-driven locking hook for locking the soft top to a cowl above the windshield. The soft top is able to be folded back into a rear stowed position, in which it may be held by means of a blocking device. The blocking device comprises the locking hook on the soft top side and a pivotable locking bolt on the bodywork side which in the blocked state of the soft top is in locking engagement with a locking hook lug. The soft top comprises a locking drive operatively connected to the locking hook for pivoting the locking hook between its locked position and its unlocked position, the pivoting of the locking hook which may be effected thereby being controlled both when locking the soft top to the cowl and when blocking the soft top in the rear stowed position.

The known soft top has a series of drawbacks. For example, the blocking of the soft top requires a precise control of the locking drive which is coordinated with the movement of the soft top and thus is relatively complicated. A further drawback is that a small amount of clearance and/or zero clearance of the soft top in the blocked state is only possible with low production tolerances and an accurate actuation of the locking hook. Moreover, releasing the blocking requires a relatively large expenditure of force, by means of which the locking hook, which is in the force flux of the blocking force, may be pivoted. As a result of the construction, an "emergency release" of the blocking (when the locking drive fails) is not possible.

It is an object of the present invention to simplify the blocking and the release of the blocking in a soft top (hood) for a motor vehicle of the aforementioned type.

This object is achieved in a generic soft top (hood), by the blocking device having a spring device, against the spring force of which the soft top moves into the stowed position, and in that the pivoting of the catch hook into its position of release for releasing the blocking may be effected by means of the locking drive. The dependent claims relate to advantageous developments of the invention.

The soft top according to the invention moves counter to the spring force of a spring device into the rear stowed position, so that a portion of the forces acting on the soft top in the blocked state may already have been absorbed by the spring device. A further portion of the forces is absorbed by the engagement of the catch hook with the catch hook engagement part. For releasing the blocking, the locking drive which is in any case present for locking and unlocking the soft top on the front side is advantageously used, in order to pivot the catch hook into its position of release. Advantageously, the design of the catch hook, together with the associated catch hook engagement part, may be undertaken independently of the construction and the movement path of the locking hook, so that the components provided for locking on the front side, in particular the locking hook, may be designed in an optimal manner for their respective purpose, independently of the components provided for the blocking on the rear side, in particular the catch hook. In particular, designs are possible in which an entirely passive blocking takes place by moving the soft top into its stowed position and/or the blocked soft top is held in a simple manner without clearance and/or a relatively small expenditure of force is required for releasing the blocking, which is advantageous in particular for providing an emergency release in the event of the failure of the locking drive.

In particular with regard to saving constructional space and weight in the soft top region, an arrangement of the spring device on the bodywork side is preferred. In this case, the spring device may, for example, comprise a centering receiver, which is spring-loaded counter to the insertion direction of the soft top into the stowed position, for centering a centering pin on the soft top side. Alternatively, on the bodywork side a spring-loaded centering pin may also be provided which, when inserting the soft top into the stowed position, moves into a centering receiver on the soft top side.

Generally, it is advantageous if the spring device is held together structurally by a centering device which, when the soft top is blocked, receives forces acting transversely to the insertion direction of the soft top into the stowed position, for example forces in the longitudinal direction and/or transverse direction.

In a preferred embodiment, it is provided that the pivoting of the catch hook into its position of release for releasing the blocking is effected by a portion of the locking hook moving counter to a central portion of the catch hook. This is therefore advantageous, in particular, as in this case the drive connection and/or geared connection between the locking drive and the locking hook may also be used during the release of the blocking, and no drive connection provided specifically therefor is required between the locking drive and the catch hook. In a particularly structurally simple embodiment it is provided that the release of the blocking is effected by moving a free end of the locking hook against the central portion of the catch hook.

In a preferred embodiment, it is provided that the amount of spring force of the spring device is at least sufficiently large for the engagement of the catch hook with the catch hook part to be held without clearance in the unloaded state of the soft top. With regard to possible greater loads of the blocked soft top occurring in practice, for example when the vehicle, with the soft top open, drives over a bumpy road the amount of spring force is preferably even greater (for example twice as large). This then has the additional effect that, simply by the release of the blocking, the soft top is moved, driven by the spring force, one stage further out of its stowed position. The advantages which may be achieved thereby in practice become clear from the embodiment to be described further below.

The invention is suitable for practically any type of soft top (hood) such as, for example, a folding soft top with a flexible soft top material, which is stretched over a soft top linkage or, for example, an openable vehicle roof formed from a plurality of roof panels which may be moved counter to one another.

In a preferred embodiment, the locking device respectively comprises the locking hook in a manner known per se on both sides of the center of the vehicle, which then cooperates with locking hook engagement parts of the windshield frame arranged on both sides of the center of the vehicle. Also, in a manner known per se, the locking device may further comprise centering components arranged on the soft top side and on the bodywork side, such as for example a centering pin on the top of the soft top and a corresponding centering receiver on the windshield frame (or vice versa). These centering components are preferably also provided on both sides of the center of the vehicle.

Also, the blocking device provided according to the invention may advantageously comprise on both sides of the center of the vehicle respectively the catch hook with the associated catch hook engagement part, as well as the spring device.

With an arrangement of the components of the locking device and/or the blocking device on both sides, a common locking drive may be provided. Alternatively, a suitable locking drive may be provided for each vehicle side.

The locking drive may, for example, be an electromotive drive. Alternatively, for example, a hydraulic or pneumatic drive may also be considered.

The locking hook is preferably able to be pivoted about a transverse axis.

If the catch hook is arranged on the soft top, with regard to a simplified construction it is preferable if a pivot axis of the locking hook at the same time forms a pivot axis of the catch hook. To this end, for example a bearing pin may be provided extending in the transverse direction and mounted on the front soft top portion, which penetrates both the locking hook and the catch hook and forms a common pivot bearing for these two hooks.

If, however, the catch hook is arranged on the bodywork, and accordingly the catch hook engagement part is arranged on the soft top, for a simplified construction the catch hook engagement part may be provided in the region of the pivot axis of the locking hook. For example, a bearing pin of the locking hook extending in the transverse direction may bear or form at one of its ends the catch hook engagement part.

In a preferred embodiment the catch hook may be pivoted about a transverse axis. In this case, the catch hook engagement part may, for example, be formed by a laterally projecting pin or pin portion. Such a pin and/or pin portion may, in its region provided for engagement with the catch hook, have at least one oblique surface (for example conical surface), in order to ensure lateral guidance of the relevant catch hook portion when forming the engagement connection.

In a preferred embodiment, the catch hook is spring-loaded in the direction of the blocked position. Thus a blocking of the soft top in a passive manner and a passive maintenance of the blocking is possible in a particularly simple manner. In this connection it is preferred that for the blocking, the catch hook is initially pivoted in the direction of its position of release and when reaching the stowed position is pivoted back, driven by the spring, into engagement with the catch hook engagement part.

Preferably the catch hook is arranged on the bodywork side and the catch hook engagement part is arranged on the soft top side. In principle, however, the reverse arrangement of these two components is also considered.

Figure 2:
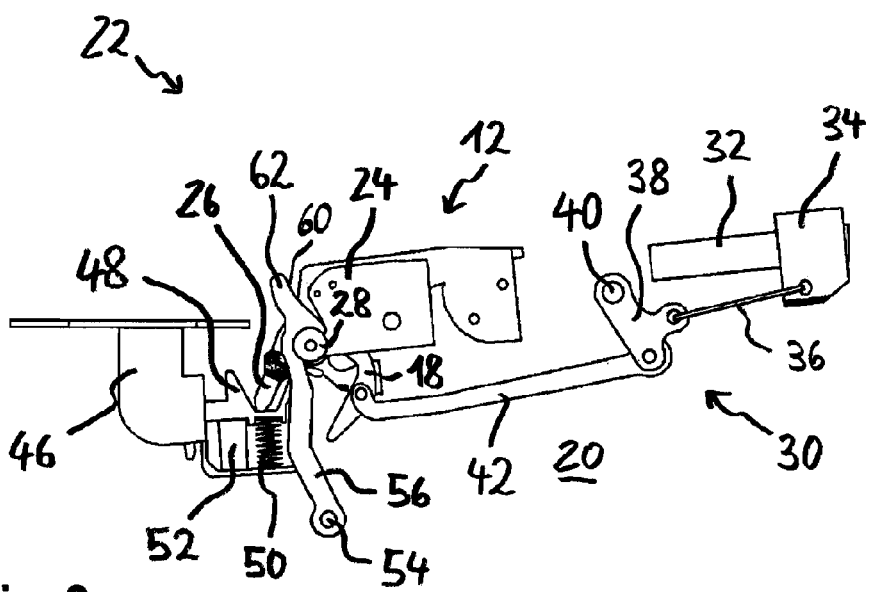
Figure 3:
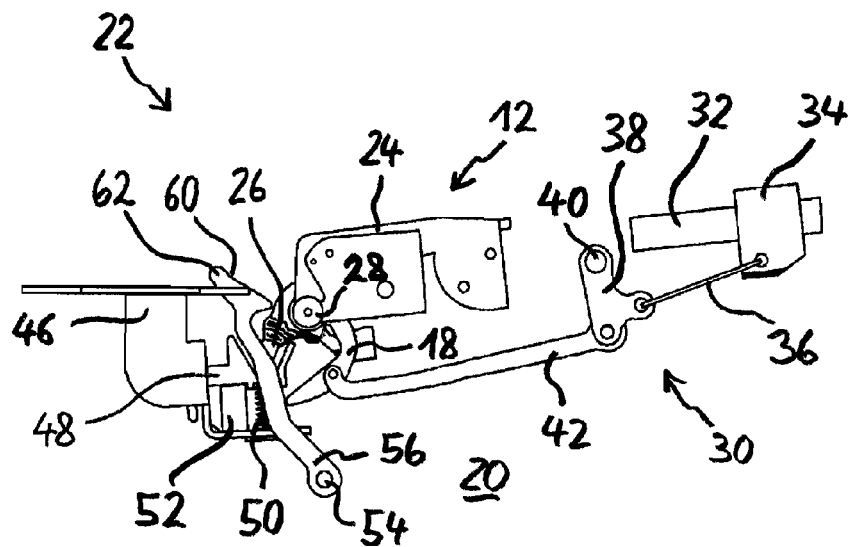
Figure 4:
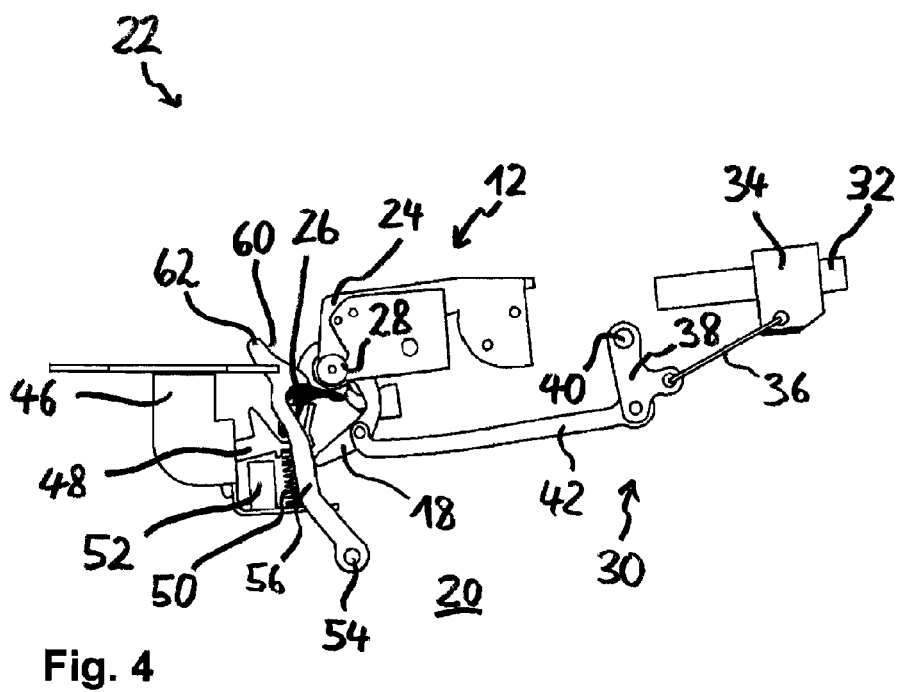
Figure 5:
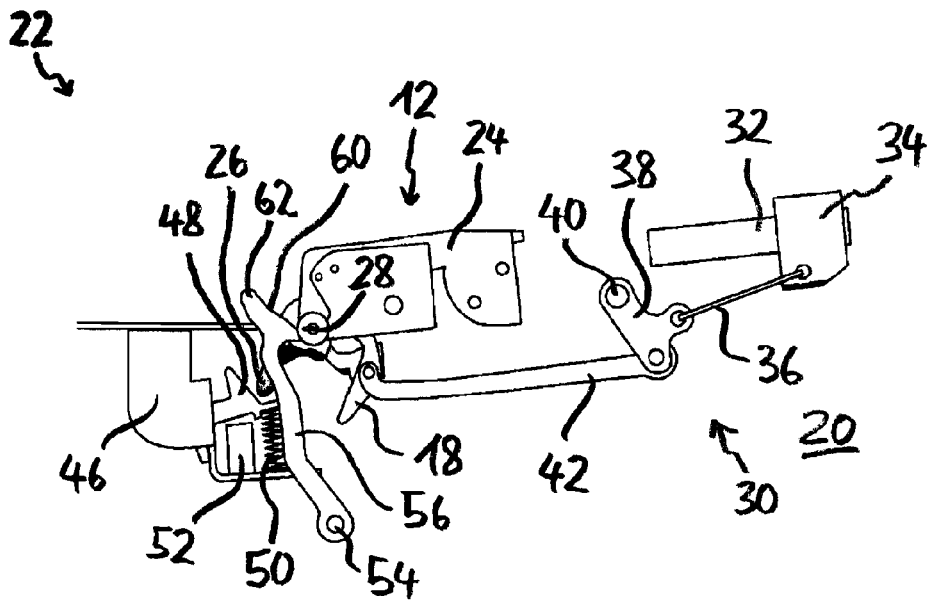
Figure 6:
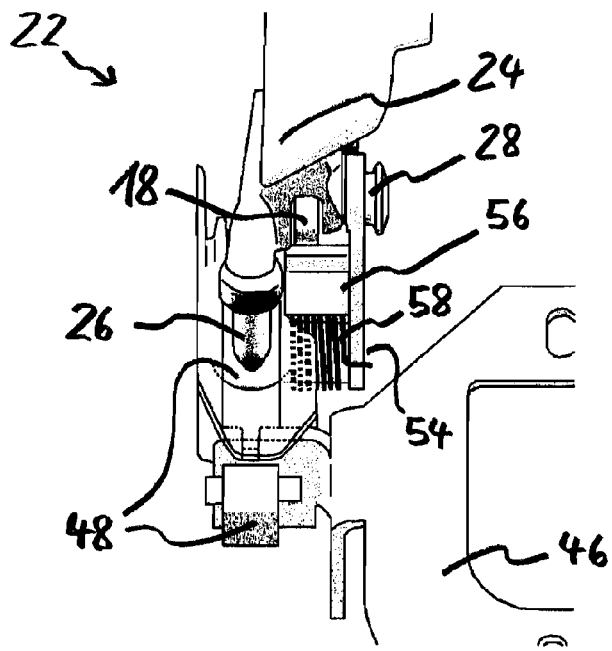

The invention is described in more detail hereinafter with reference to an embodiment and referring to the accompanying drawings, in which:

FIG. 1 is a perspective view of a cabriolet soft top,

FIG. 2 is a schematic side view of a blocking device by means of which the soft top of FIG. 1, after folding back said soft top, is blocked in a rear stowed position, FIG. 3 is a view corresponding to FIG. 2 immediately after release of the blocking of the soft top visible in FIG. 2, FIG. 4 is a view of the blocking device corresponding to FIG. 2 in a state after the release of the blocking, in which the soft top has been moved, driven by the spring, one stage further out of its stowed position, FIG. 5 is a view corresponding to FIG. 2 of the blocking device in a state immediately before the start of a soft top closing process, and FIG. 6 is a schematic perspective view of the blocking device.

FIG. 1 shows a soft top 10 of a cabriolet vehicle in its closed position in which a front soft top portion 12 bears against a windshield frame 14 and may be locked thereto.

For the sake of the clarity of the drawings, in FIG. 1 only the part of the soft top and/or of the adjacent vehicle components are shown to the left of a vehicle longitudinal center line C-C.

Components of a locking device are respectively arranged on both sides of the center of the vehicle, by means of which the soft top 10 may be locked with its front soft top portion 12 to the windshield frame 14. The location of the locking components located to the left of the center of the vehicle is illustrated in FIG. 1 in dotted lines at 16. The right-hand locking components (not shown) are arranged symmetrically to the vehicle longitudinal center line C-C. Of the components of the locking device arranged on both sides of the center of the vehicle as well as a blocking device to be described further below, only the components located on one vehicle side are described in detail as a result of the symmetrical design.

The locking device comprises in the region 16 on the soft top side a locking hook 18 which may be pivoted into a locked position (see FIG. 2) which in the locked state of the soft top engages below a corresponding locking hook engagement part on the windshield frame 14. The soft top may be opened after pivoting the locking hook 18 into an unlocked position. In the embodiment shown, the soft top is opened by folding back the soft top 10 into a rear stowed position, driven hydraulically, in which the soft top 10 is accommodated folded up in a soft top compartment 20 in the rear region of the vehicle and may be blocked there by means of a blocking device 22 which is described subsequently with reference to FIGS. 2 to 6.

FIG. 2 shows the portion of the components of the blocking device 22 arranged on one vehicle side, which are particularly essential for understanding the present invention. These components are actually provided in duplicate, symmetrically to the center of the vehicle.

FIG. 2 illustrates the soft top 10 blocked in its rear stowed position from which in FIG. 2 a lateral soft top linkage front part 24 with the locking hook 18 mounted pivotably thereon, a centering pin 26 fixedly arranged on the front part 24, a catch hook engagement part 28 as well as an actuating mechanism 30 for pivoting the locking hook 18 are visible.

The soft top linkage front part 24 forms together with the soft top fabric, not shown in FIG. 2, and spanning said part, the top (the transversely extending front edge) of the soft top 10. The catch hook engagement part 28 is a pin portion projecting outward and laterally from the front part 24 and widened in the manner of a mushroom at its free end. In the region of this catch hook engagement part 28 is located the transversely extending pivot axis of the locking hook 18, which is shown in FIG. 2 in its unlocked position. When the soft top is closed and the front part 24 together with the locking hook 18 are guided onto the windshield frame 14, the locking of the soft top 10 at the front on the windshield frame 14 may take place by pivoting the locking hook 18 clockwise.

The pivoting of the locking hook 18 takes place by an electromotive drive, of which in FIG. 2 only a linear guide 32 fixed to the soft top is visible with a carrier 34 which may be moved in the longitudinal direction (for example a spindle drive). The movement of the carrier 34 along the linear guide 32 is converted via a first guide rod 36, a pivoting plate 38, which may be pivoted at 40 about a transverse axis fixed to the soft top, and a second guide rod 42 into a corresponding pivoting movement of the locking hook 18. The components 36, 38 and 42 together form the actuating mechanism 30 for pivoting the locking hook 18 between the unlocked position shown and a locked position pivoted clockwise by approximately 90 degrees. The centering pin 26 shown, which serves for centering the soft top in the rear stowed position, may be a centering pin which at the same time is also used for centering the soft top 10 at the front. In the embodiment shown, however, the centering pin 26 is a part provided solely for centering in the rear stowed position.

A support part 46 on which a funnel-like centering receiver 48 projects pivotably movably to the rear, in which the centering pin 26 in the rear stowed state of the soft top 10 is received and is centered both in the vehicle longitudinal direction and in the vehicle transverse direction, may be further seen in FIG. 2 as components on the bodywork side. The pivoting mobility of the centering receiver 28 is provided about a transverse axis which is located in the region of the support part 46. The centering receiver 48 in the state shown is loaded by the centering pin 26 downward and/or clockwise and pressed and/or pivoted downward counter to the force of a compression spring 50. In the embodiment shown, an elastic damping member 52 is arranged functionally parallel to the spring 50, by means of which to a certain extent a "flexible stop" is formed for pivoting the centering receiver 48, which counteracts a downward movement of the soft top 10.

An upward movement of the blocked soft top 10, is prevented by the engagement of a catch hook 56 pivotably mounted about a transverse axis 54 on the bodywork side with the catch hook engagement part 28 on the soft top side.

In the blocked state of the soft top 10 according to FIG. 2, the soft top 10 is thus securely held on and/or in the soft top compartment 20. In this connection, by means of the spring devices 50, 52, irrespective of any possible production tolerances, an engagement without clearance is ensured between an upper hook portion of the catch hook 56 and the engagement part 28.

A release of the blocking of the soft top 10 may be initiated in a simple manner by activating the locking drive provided for pivoting the locking hook 18. In the embodiment shown, it is provided that for releasing the soft top blocking device 22 the locking drive is briefly activated for pivoting the locking hook 18 in the direction of its locked position (pivoting clockwise) and the locking hook 18 is then again pivoted back into its unlocked position. As a result, the situations and/or stages shown in FIGS. 3 to 5 result.

FIG. 3 shows the situation in which the locking hook 18 is pivoted one stage further clockwise, and with its free end presses a central portion of the catch hook 56 counter to the force of a spring 58 (see FIG. 6) not visible in FIGS. 2 to 5, forward and/or counterclockwise so that the upper hook portion of the catch hook 56 comes out of engagement with the catch hook engagement part 28.

Then the compression spring 50 may be released by lifting the centering receiver 48 and thus the soft top 10. This situation is shown in FIG. 4.

If, as shown in FIG. 5, the locking hook 18 is again pivoted back into its initial position (unlocked position) the catch hook 56 driven by the spring pivots again in the direction of its blocked position (clockwise). Due to the slightly raised position of the soft top 10 and thus of the catch hook engagement part 28, the hook portion of the catch hook 56 in this case, however, is no longer able to come into engagement with the engagement part 28.

The soft top 10 is then moved further in the closing direction by means of a hydraulic drive provided therefor, namely in order to reach the closed position again shown in FIG. 1.

If the soft top 10, proceeding from the closed position shown in FIG. 1, is folded back and is moved into the rear stowed position, the disclosed embodiment advantageously implements a passive blocking of the soft top in the sense that, apart from the motorized and/or hydraulically driven soft top movement, no active driving of any components of the blocking device is required. If, namely, during the soft top opening process the catch hook engagement part 28 on the soft top side comes into contact with the catch hook 56 held in a spring-loaded manner in its blocked position, the engagement part 28 acts on an oblique surface and/or control surface 60 of the catch hook 56 located above the hook region, so that the catch hook 56 is therefore initially pivoted by overcoming its spring loading in the direction of its position of release and then the engagement part 28 engages in the hook portion. Immediately before this engagement, the situation shown in FIG. 5 results which, when the soft top moves further in the stowed direction, immediately leads into the situation according to FIG. 2, in which the soft top 10 is held locked in position against the blocking device 22.

FIG. 6 again shows once again in an oblique plan view several of the components of the blocking device 22 already described above.

In the embodiment shown, the free end of the catch hook 56 is formed from a gripping lug 62 which is easily accessible from above, with which the catch hook 56 for the purpose of emergency release (in the event of the failure of the locking drive) may be engaged for pivoting. A rear edge of this gripping lug 62 also viewed in the longitudinal direction forms the aforementioned control surface 60.

In summary, in the above disclosed vehicle soft top a blocking device located in the region of the main bearing of the soft top is used, which comes into blocking engagement, as soon as the soft top 10 reaches the stowed position. In a similar manner to a ski binding, immediately before reaching the stowed position a spring loading force is overcome, for which a soft top hydraulic system and/or an electrical main drive provides the required pressure. The pretension to be overcome comes from a centering mechanism at the stowed position which is subjected to spring pressure and is also useful for the blocked stowed state of the soft top, namely also in order to secure the soft top against dynamic loads when the vehicle is traveling.

The locking element of the blocking device is a catch hook articulated on the bodywork side, which engages on a counter part (catch hook engagement part) on the front roof frame of the soft top. Also, the reverse arrangement of these two blocking components is possible.

A brief actuation of the locking hook, which is in any case present for locking the soft top, is sufficient in order to release the blocking on the rear side. This then snaps open and the soft top is raised one stage further. The locking hook may be immediately moved back again into its initial position which triggers an electronic soft top control unit without taking into account any sensor signals. The soft top may then be immediately driven by the corresponding main drive in the closing direction. A further advantage of the disclosed embodiment is that a simple emergency unlocking of the blocking device 22 is possible by manually pivoting the spring-loaded catch hook. The soft top 10 then automatically springs slightly upward (driven by the force of the compression spring 50). A motorized drive is not necessary for this release of the blocking. In this regard, it is advantageous if in the blocked state of the soft top the free end of the catch hook is accessible for a user from above for such manual pivoting. In the disclosed embodiment, due to the articulation of the catch hook 56 on the bodywork side, the free end thereof is easily accessible from above. Due to the overall simple construction a specific sensor for detecting the blocking is dispensed with.

The invention claimed is:

1. A soft top for a motor vehicle, which may be locked in its closed position by means of a locking hook arranged on a front soft top portion which may be pivoted into a locked position on a windshield frame and after pivoting the locking hook into an unlocked position may be displaced into a rear stowed position in which the soft top may be blocked by means of a blocking device, the soft top comprising a locking drive operatively connected to the locking hook for pivoting the locking hook between the locked position and the unlocked position, the blocking device on the bodywork side or on the soft top side comprising a catch hook, which may be pivoted between a blocked position and a position of release and in the blocked position in the blocked state of the soft top is in engagement with a catch hook engagement part on the soft top side and/or bodywork side, characterized in that the blocking device has a spring device, against the spring force thereof the soft top moves into the stowed position and in that the pivoting of the catch hook into its position of release for releasing the blocking may be effected by means of the locking drive.

2. The soft top of claim 1, the spring device being arranged on the bodywork side.

3. The soft top of claim 2, the spring device comprising a centering receiver, which is spring-loaded counter to the insertion direction of the soft top into the stowed position, for centering a centering pin on the soft top side.

4. The soft top of claim 1, the pivoting of the catch hook into its position of release for releasing the blocking being effected by a portion of the locking hook moving counter to a central portion of the catch hook.

5. The soft top of claim 1, the catch hook being able to be pivoted about a transverse axis.

6. The soft top of claim 1, the catch hook being spring-loaded in the direction of the blocked position.

7. The soft top of claim 6, the catch hook and the catch hook engagement part, when inserting the soft top into the stowed position, cooperating such that the catch hook is initially pivoted by overcoming its spring loading in the direction of its position of release and when reaching the stowed position is pivoted back, driven by the spring, into engagement with the catch hook engagement part.

8. The soft top of claim 6, the catch hook being arranged on the bodywork side and the catch hook engagement part being arranged on the soft top side.

* * * * *